(12) United States Patent
Petrov

(10) Patent No.: US 11,844,354 B2
(45) Date of Patent: Dec. 19, 2023

(54) THERMAL MOLD FOR MAKING EDIBLE CONTAINER FOR FOOD PRODUCTS

(71) Applicant: Evgeniy Nickolaevich Nefedov, Kurganinsk (RU)

(72) Inventor: Maksim Sergeevich Petrov, Moscow (RU)

(73) Assignee: Evgeniy Nickolaevich Nefedov, Kurganinsk (RU)

( * ) Notice: Subject to any disclaimer, the term of this patent is extended or adjusted under 35 U.S.C. 154(b) by 103 days.

(21) Appl. No.: 17/346,464

(22) Filed: Jun. 14, 2021

(65) Prior Publication Data

US 2021/0298313 A1 Sep. 30, 2021

Related U.S. Application Data

(63) Continuation-in-part of application No. 16/961,460, filed on Jul. 10, 2020, now abandoned, which is a continuation-in-part of application No. PCT/RU2014/000648, filed on Dec. 28, 2018.

(30) Foreign Application Priority Data

Jan. 15, 2018 (RU) .............................. RU201810310

(51) Int. Cl.
A21B 5/02 (2006.01)
(52) U.S. Cl.
CPC .............. *A21B 5/026* (2013.01); *A21B 5/023* (2013.01)
(58) Field of Classification Search
CPC .......... A21B 5/026; A21B 5/023; A21D 13/31
USPC ................................... 99/327, 328, 383, 384
See application file for complete search history.

(56) References Cited

U.S. PATENT DOCUMENTS

| 1,854,224 | A | | 4/1932 | Rankin |
| 1,936,835 | A | | 11/1933 | Fairchild |
| 3,565,146 | A | | 2/1971 | Arnolds |
| 4,214,517 | A | | 7/1980 | Caldwell |
| 5,223,286 | A | * | 6/1993 | Selbak ................... A21B 5/026 426/138 |

(Continued)

FOREIGN PATENT DOCUMENTS

| RU | 96735 U1 | 8/2010 |
| WO | 2009130556 A1 | 10/2009 |

OTHER PUBLICATIONS

Search report in PCT/RU2018/050170, dated Apr. 25, 2019.

*Primary Examiner* — Tu B Hoang
*Assistant Examiner* — Thomas J Ward
(74) *Attorney, Agent, or Firm* — Bardmesser Law Group

(57) ABSTRACT

Thermal mold for baking halves of an edible container, including a first heated plate having a recess that replicates an outer surface of a baked half of the edible container; a second heated plate that has at least one protrusion that replicates an inner surface of the baked half. The protrusion mates to the recess with a gap therebetween. The plates are brought together with an offset forming a horizontal surface around the recess and form the gap such that baked dough forms a tray. Second plate has teeth located along the horizontal surface, the teeth are inward and below the horizontal surface for forming cavities on an inner surface of the baked half. The second plate has cavities between the teeth and inward and above the horizontal surface for forming teeth on the inner surface of the baked half. Heater is around the recess and protrusion in plan view.

19 Claims, 13 Drawing Sheets

(56) References Cited

U.S. PATENT DOCUMENTS

| | | | |
|---|---|---|---|
| 5,613,426 A * | 3/1997 | Chan Gabbai | A47J 37/0611 99/383 |
| 6,029,803 A | 2/2000 | Ovadia | |
| 7,854,949 B2 | 12/2010 | Haas | |
| D663,590 S * | 7/2012 | Muspratt-Williams | D7/674 |
| D725,342 S | 3/2015 | Desposito | |
| 9,468,216 B2 * | 10/2016 | Parth | A21B 3/134 |
| 9,554,670 B2 * | 1/2017 | Yan | A47J 37/0611 |
| 2008/0008785 A1 | 1/2008 | Vicentini | |
| 2010/0005975 A1 | 1/2010 | Mitchell | |
| 2015/0230659 A1 * | 8/2015 | Hoare | A47J 37/0611 99/375 |

\* cited by examiner

THERMAL MOLD FOR MAKING EDIBLE CONTAINER FOR FOOD PRODUCTS

CROSS REFERENCE TO RELATED APPLICATIONS

This application is a continuation in part of U.S. patent application Ser. No. 16/961,460, filed on Jul. 10, 2020, which is a US National Phase of PCT/RU2018/050170, filed on Dec. 28, 2018, which claims priority to Russian patent application no. 2018101310, both of which are incorporated herein in their entirety.

FIELD OF INVENTION

The invention relates to the field of cooking and bakery production, in particular to the field of fast food.

DESCRIPTION OF THE RELATED ART

The modern world is accelerating more and more, and people are increasingly choosing for themselves "what's faster," including fast food. And this means: quick hunger relief, (relatively) low price, monotonous and extremely limited menu and great harm to health, despite the fact that all this is accompanied by a large amount of garbage, most of which is food product packaging. In this regard, in the modern market of culinary products, there is a need for culinary containers containing various fillings and allowing to dispense with packaging, because the culinary container itself is edible.

The edible container is not designed to fight against fast food, but to ensure its qualitative improvement/change from the inside. So, the edible container is designed to preserve the obvious advantages of "fast food" while reducing its disadvantages due to: expanding the range of the menu, offering healthier foods and dishes, avoiding packaging, disposable tableware and appliances. The main idea of an edible container is simple: to make a completely closed edible packaging for placing food in it. It looks like a wafer cup—food is eaten along with the packaging.

For example, an edible container is known to contain two identical forming modules-halves made by bending the edges towards each other with the possibility of connecting them along the entire perimeter of the outer contours of the modules-halves, while the connected edges of the modules have a wave-like profile consisting of alternately convex and concave segments having the same profile, length and height, and when two modules are connected, all the convex and concave segments of one module are completely in contact with all the concave and convex segments of another module. For the convenience and reliability of the module-half fixing, the container can be equipped with an additional clamp of two modules-halves, made in the form of a paper tightening tape covering them, tightly attached by a sticky substance deposited on the surface of one of its ends (RU 96735, published on 20 Aug. 2010). This solution was taken as a prototype for the proposed edible container.

The known edible container has a number of serious drawbacks, which did not allow using it to the fullest convenience. The known container is made of two interconnected halves, inside of which the food product itself is located. But these halves are made like trays, that is, they have a practically flat or slightly convex bottom. When squeezed by hand while eating, the bottom parts are affected by the natural pressure of the fingers. Due to the fact that the container is made of baked dough and has a brittle structure with a small wall thickness, such a container often falls apart in the hands due to the appearance of longitudinal cracks in the shell of this tray. Another disadvantage is that both trays (of module-half) of the container docked along the end surfaces of the side walls. The presence of a wave-like shape at the contact point made it possible to exclude the displacement of the halves relative to each other due to the fact that a symmetrical closed contact contour is formed. But when biting off the edge of the container, this mutual balance in the position of the halves was violated, and the halves first moved along and then to the sides along the contact surface (horizontal displacement), which leads to a change of the shape and the container would fall apart. This creates an inconvenience in use and does not allow considering such a container suitable for use in a mass and fast food system.

That is why in the known container a binding paper tape is used, which wraps the container to prevent the displacement of the halves while eating. At the same time, as the container is eaten, this tape has to be moved down, which also not only complicates the design, but also creates inconvenience for the user.

Such halves in the form of trays are made in thermal presses replicating the design of wafer molds used for baking the wafer cups. Such wafer molds for baking hollow wafer products typically contain a base heating plate with recesses repeating the external shape (outer surface) of the cup, which is a matrix, and a second heating plate turned in relation to the matrix, which is a punch and bears the protrusions, repeating the internal shape (inner surface) of the cup, wherein protrusions, when closing the plates, move into the recesses in which they are located with a gap relative to the wall of the recesses (RU 2345525, published on 10 Feb. 2009). This solution was taken as a prototype for a thermal press for the manufacture of parts of an edible container according to the invention.

When the set temperature for heating the plates has been reached, a portion of dough is put into each recess and lowers the punch until the plates come into contact with each other. The protrusions, delving into the recesses of the matrix, squeeze the dough, causing it to spread along the wall of the recess. After that the dough mass is baked and crystallized under the influence of temperature, taking the form of a thin-walled cup. As a rule, the plates are adjacent to each other with the formation of gaps in some places to ensure the release of steam and relieve high pressure in the recesses. These places are exactly at the level of the flange of the cup (gas and vapor come from the dough). But due to the fact that the edges of the cup are not pressed, these edges of each cup become uneven, chipped, although this, when used for ice cream, does not spoil the presentation, since this edge is not used for anything.

It is the object of this invention to overcome the disadvantages of the prior art, and to provide the above identified advances in the art.

SUMMARY OF THE INVENTION

The present invention is aimed at achieving a technical result, which consists in maintaining the strength of the container by eliminating the displacement of its halves when eating the container itself and its contents.

The specified technical result for the first object is achieved by the fact that in an edible container for food products containing two halves of the same shape and design, each of which is made of baked dough and has the form of a thin-walled tray with side walls on which protrusions and hollows are made, each half is made symmetrical in plan view in the shape of the tray relative to at least one axis passing along the surface of the bottom of the tray, and both halves are interconnected with the location of the protrusions of one half in the hollows of the other half for the formation of a hollow thin-walled shell, along the edge of the side walls of each tray a support end platform is made to ensure resting of the trays against each other when they are connected, and protrusions and hollows in each tray are located along this support platform from the side of the inner wall of the tray while the protrusions are located above the level of the support platform, and the hollows are located below this level, the recesses are made on the outer surface of the tray opposite to each protrusion inside the tray extended along the height of side wall to form stiffeners on the outer surface, and each protrusion in the tray is located opposite to such the recess.

The specified technical result for the second object is achieved in that the thermal mold for baking the halves of the edible container includes a first heated plate having a recess that replicates an outer surface of a baked half of the edible container; a second heated plate that has at least one protrusion that replicates an inner surface of the baked half of the edible container, wherein, when the first and second heated plates are brought together, the protrusion mates to the recess with a gap between the protrusion and the recess; wherein, the first and second heated plates are brought together, are in direct contact with each other with an offset forming a horizontal surface in a zone around the recess and form the gap, where the gap has a form such that baked dough that fills it forms the baked half of the edible container in a shape of a tray; the second heated plate has teeth located along the horizontal surface, wherein the teeth are located inward and below the horizontal surface for forming cavities on an inner surface of the baked container half; and the second heated plate has cavities located between the teeth, wherein the cavities are located inward and above the horizontal surface for forming teeth on the inner surface of the baked container half. A heater for baking the edible container and located around the recess and the protrusion in plan view; wherein the second heated plate has a plurality of holes located above the cavities, wherein the holes have an initially cylindrical profile of its inner portion and a tapered outer portion.

The specified technical result for the third object is achieved in that the device for extracting the halves of the edible container from the mold and cleaning the gas vents of the thermal mold contains a base flat on one side on which spokes are fixed at points corresponding to the locations of the through holes on the punch of a thermal mold for introducing these spokes into these holes.

These features are related to formation of the steady combination of features sufficient for achievement of the necessary technical result.

The present invention is explained by the specific embodiment which, however, is not the only one possible, but illustrates the possibility of achievement of the necessary technical result.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

According to the present invention, the design of an edible container consists of two identical edible halves interconnected for consumption of "difficult" products: vegetable and fruit salads, cottage cheese, mashed potatoes, various side dishes, canned foods and cereals. The edible container is made as a wafer cup from baked dough.

In addition, the proposed device allows the following:
to make it technically possible to use on the street all products and dishes (except liquid ones) without using a table in a cafe, without any tableware, cutlery and packaging;
to ensure maximum reliability of use in street conditions: not to crumble, lose its integrity, both in horizontal and vertical positions, not to lose the products and dishes contained in it, or become unusable during the entire use;
be simple and convenient to use.

The culinary edible container is a small box that is easy to hold in one hand, i.e., a container made of edible material. The container may contain any food except liquid. The modules-halves forming the cooking container can be made from baked dough similar to the dough used in waffle production or other edible material, providing such necessary parameters as edibility, density and brittleness.

Figure 3:
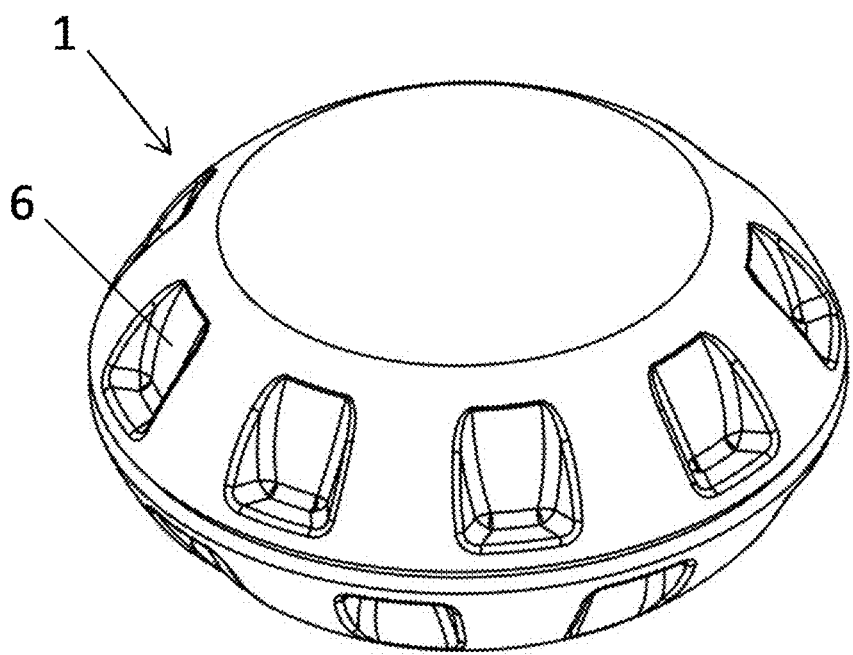
FIG. 3 is a perspective view of a round edible container.

The edible container 1 for food products (FIGS. 1 and 3) has two halves 2 of the same shape and design, made, for example, from baked dough, which gives this container such a positive property as edibility.

Figure 4:
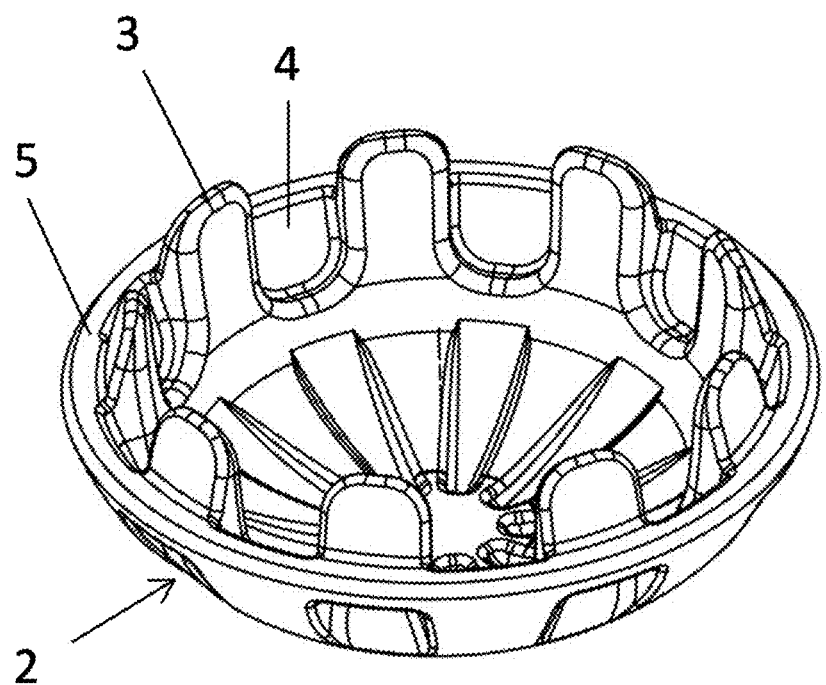
FIG. 4 is a half of a tray-shaped container for the example of FIG. 3.

Each half 2 is made in plan in shape of the tray symmetrical with respect to at least one axis passing along the surface of the bottom of the tray. That is, if you look at the half (tray) from above, then its left part is made identical in shape to the right side. This is necessary so that when the half is flipped, it can be installed on the side of the side wall of the lower half of the tray. For an example of execution of an oblong shaped container (FIGS. 1 and 2), symmetry is observed along the longitudinal and transverse axes. For an example of a container with a circular shape in the plan view (FIGS. 3 and 4), symmetry is observed with respect to all axes passing through the geometric center of the figure in the plan.

Each half 2 has the form of a thin-walled tray with side walls (FIGS. 2 and 4), on which protrusions 3 and hollows 4 are made, thanks to which both halves are interconnected without displacements. Both halves are interconnected with the location of the protrusions of one half in the hollows of the other half to form a hollow thin-walled shell.

To avoid displacements and ensure reliable fixation of the halves in the collection container an end support platform 5 is made along the edge of the side walls of each tray to ensure resting of the trays against each other when they are connected. The protrusions and hollows in each tray are located along this supporting platform from the side of the inner surface of the tray. The protrusions are located above the level of the support platform, and the hollows are located below this level. Moreover, each protrusion in the tray is located opposite the recess.

The protrusions (pins) and hollows alternately form a closed loop in which the number of protrusions and hollows is always the same, with at least one axis of symmetry of the module passing strictly along the boundary between the protrusion and hollow, so that on one side of the axis of symmetry there is a protrusion, and on the other hand, a hollow.

This allows connection of the halves of the same shape and design without additional manipulation of turning and orienting one half relative to the other.

When connecting, both halves sit on top of each other resting against their end support platforms (since the halves are made identical in shape to, for example, the longitudinal axis of symmetry running along the bottom of the tray). Thus, the positioning of the trays for receiving the container is performed. And since the protrusions are located above the level of these platforms, when connecting the trays, the protrusions of one tray enter the hollows inside the other tray and ensure the exclusion of lateral displacements on either side of the trays. When biting off the edge of the container, the fixation mode remains and the halves do not diverge to the sides.

Additionally, recesses 6 are made on the outer surface of the tray opposite each protrusion inside the tray extended along the height of the side wall to form stiffeners on the outer surface. The need to add these stiffeners is due to two issues. The first is that the tray (half) is a thin-walled shell made of baked dough. When baking, it is necessary to achieve uniformity of the structure of this shell and the same maturity (ripeness) of the shell over its entire surface. This is achieved only if all the walls in the dough piece are approximately equal in thickness. And in the claimed design of the tray, the wall thickness in the region of the protrusions is significantly greater than the wall thickness in the region of the hollows. When baking, all the walls will reach the baked maturity faster than those areas that are adjacent to the protrusions. These areas will be under-baked. And if waiting for baking of these areas, then the remaining walls burn out. In this regard, the implementation of the recesses on the outer surface of the tray opposite to the protrusions leads to the fact that the wall thickness is leveled and becomes approximately the same throughout the design of the tray. The second one is that all thin-walled shells, regardless of the technology or material they are used for, have increased torsion ability, which, for their embodiment from dough, leads to destruction of the tray. The stiffeners of such shells significantly increase torsion resistance.

Figure 1:
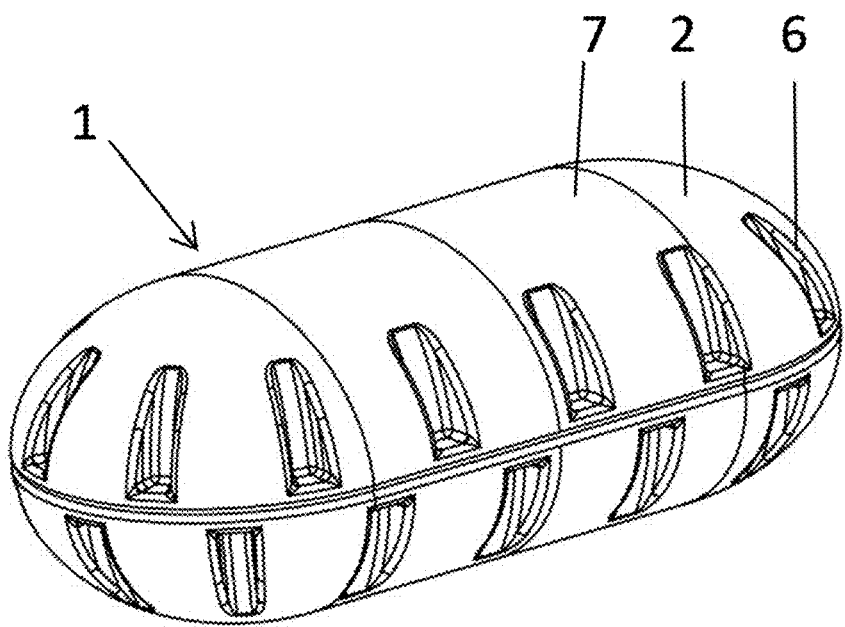
FIG. 1 is a perspective view of an oblong edible container.
Figure 2:
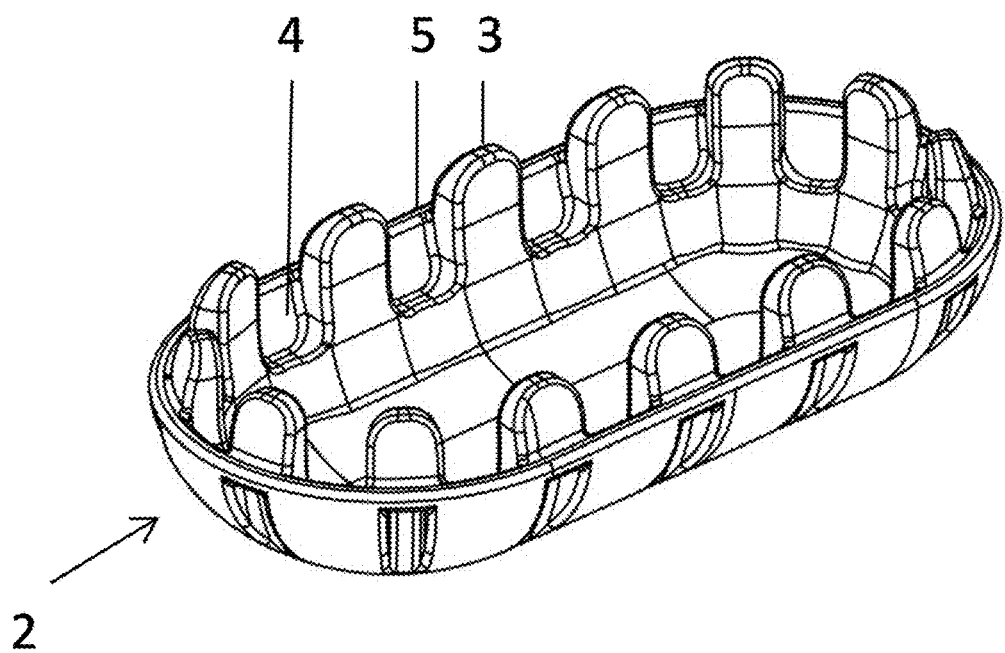
FIG. 2 is a half of a tray-shaped container for the example of FIG. 1.
Figure 5:
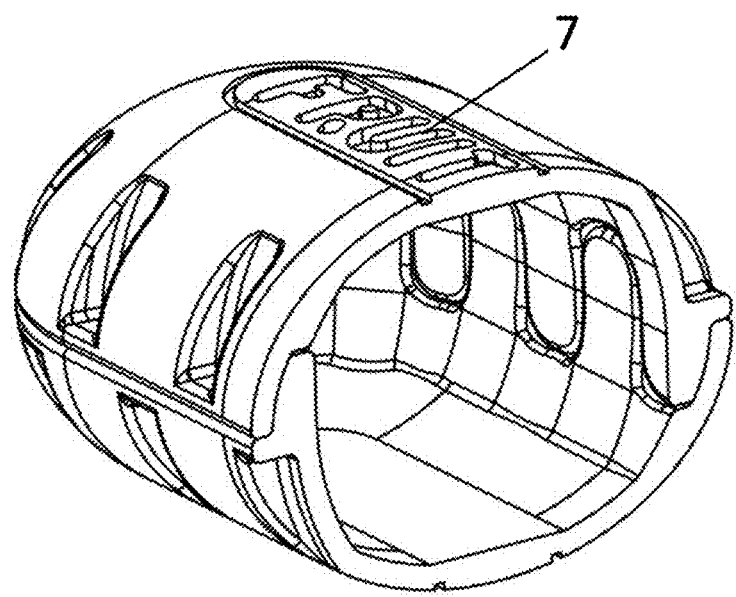
FIG. 5 is a cross-sectional view of the container of FIG. 1.

On the outer surface of the bottom of the trays places 7 can be provided for applying information. This information can be presented in the form of an inscription or picture obtained by embossing during baking, as is done when baking wafer cups (corrugated mesh) (FIGS. 1 and 5).

Figure 6:
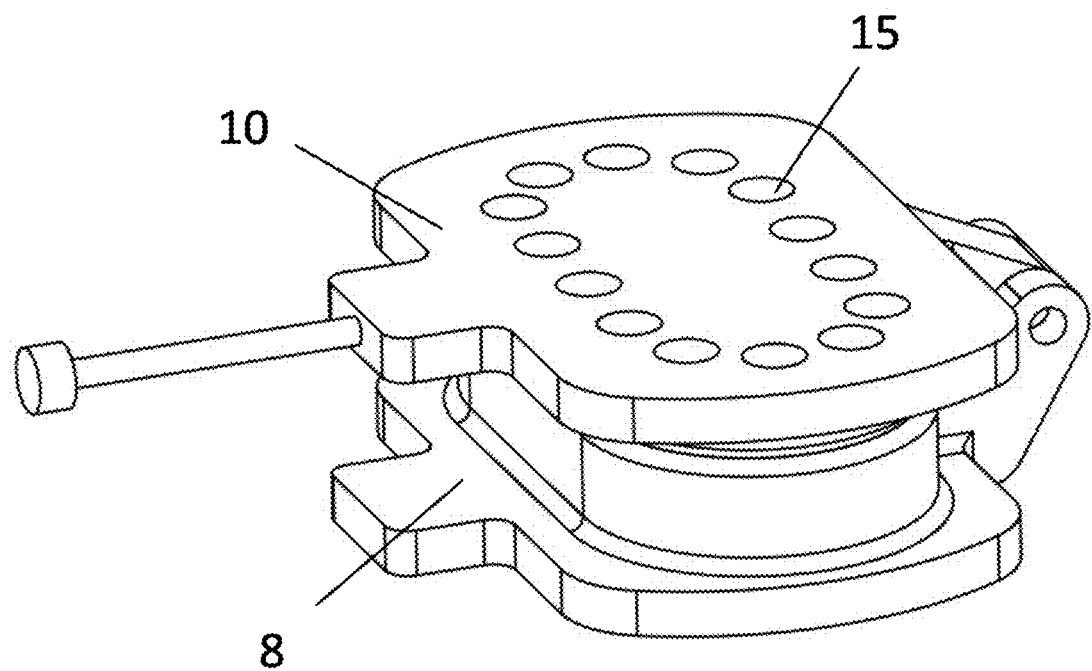
FIG. 6 is a thermal mold for making of one half for the container, closed position of the plates.
Figure 7:
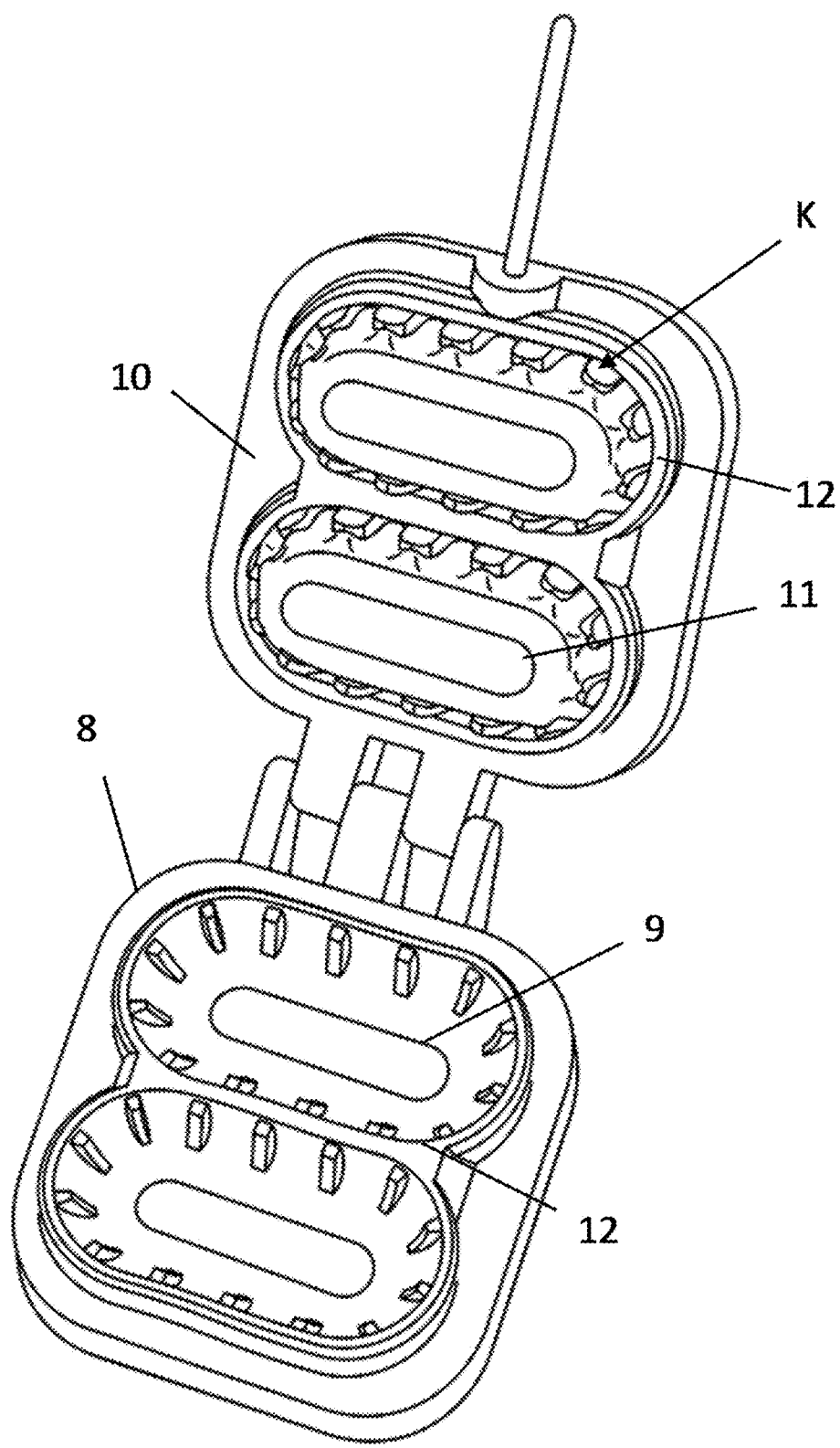
FIG. 7 is a thermal mold for making of two halves for the container, open position of the plates.

Operational reliability in the use of such edible containers is based on the reliable connection of the halves (trays) with each other. This is only possible if, when baking the trays, the accuracy of the shapes of the supporting platform, protrusions and hollows is achieved. And this is possible only when these areas of the tray are in the thermal mold in a limited volume for the flow of dough. In this regard, to obtain such halves with the exact configuration of the perimeter part of the side wall, a thermal mold with new design is used (FIGS. 6 and 7).

The thermal mold for baking the halves of the edible container contains the first heated plate 8, which is a matrix and bears at least one recess 9 (there can be more than one such recesses), repeating the external shape of the baked product, the second heated plate 10, which is a punch and bears on at least one protrusion 11, repeating the internal shape of the product. In this part, the mold design follows the well-known mold designs for baking ice cream wafer cups (for example see \*\*classifieds24.ru/biisk/oborudo-vanie-dlia-biznesa-dlia-pishchevoi-promyshlennosti/appa-rat-pech-press-3080669.html).

When the plates 8 and 10 are closed, the protrusion 11 is located in the recess 9 with a gap relative to the wall of the recess.

A feature of the new mold is that when the plates 8 and 10 are closed, they are in contact with each other in the zone around the location of the recess (area 12). When the plates are closed, they contact these areas, practically sealing the gap cavity and do not allow the dough to flow out of the gap. The cavity of the gap between the wall of the recess in the matrix and the wall of the protrusion on the punch repeats in volume the shape of the tray open at the top, the design of which is presented in the form of variants in FIGS. 2 and 4.

During baking, vapors and gases are released, creating increased pressure in the gap cavity, which must be vented. With a tight fit of plates 8 and 10, pressure relief is excluded, since the cavity of the gap 13 where the dough is located is blocked to prevent leakage of the dough. To solve this problem the through holes (gas tubes) are made in the body of the second heated plate 10 above the cavity in the zone of formation of the protrusions of the product, each of which is made on the inside of this plate 10 with a cylindrical section 14, which ends with a cone-shaped extension 15 on the outside of this plate (FIGS. 6, 8-10).

Multiple gas ducts are located only in the upper part of the mold—in the punch, directly above the center of the pin cavity. The number of gas ducts determines the number of module pins: the number of studs of the module is similar to the number of gas ducts.

Figure 8:
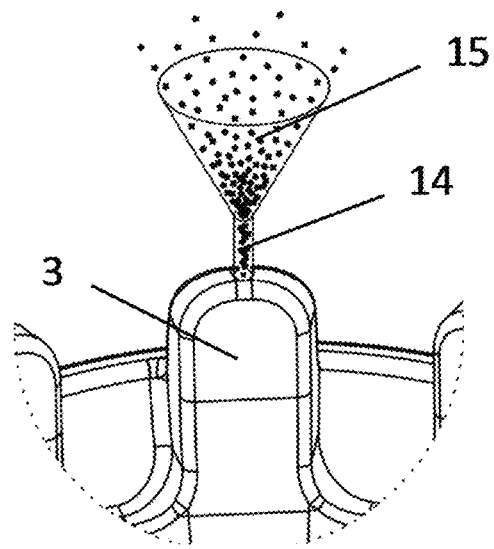
FIG. 8 is the location of the through hole for the exit of the gas-vapor agent over the protrusion of the half.

When baking, the dough spreads over the cavity of the gap and expends in volume, which leads to the filling of the entire cavity. Gases and vapors released from the dough "escape" through the through holes to the outside, as shown in FIG. 8. Since during baking the dough is firmly pressed against the walls of the matrix and punch, a smooth and even surface of the supporting platform, protrusions and indentations on the half wall is formed.

For making of trays (halves) in a thermal mold, both parts of the press are heated to the baking temperature of the dough. Then, liquid wafer dough is poured into the lower part of the press (into the concave matrix) and the press is closed with its curved part (punch).

During baking, the boiling wafer dough rises along the inner cavity of the waffle press, filling the entire enclosed volume, including the cavity of the pins. Gradually standing out from the boiling dough, hot water vapor rises to the upper part of the mold, where, having gathered in the pin cavities, it comes out in thin jets through gas pipes and funnel-shaped nozzles adjoining them in the outer surface of the punch. Unlike steam, the dough, which is filled with the pin cavities of the mold, cannot pass through the vent pipes; their diameter is small and the dough is too viscous and thick.

The press opens only after the final evaporation of moisture and baking of the dough module. The convex wafer obtained in the press (edible container module) is removed for final cooling and hardening.

Figure 11:
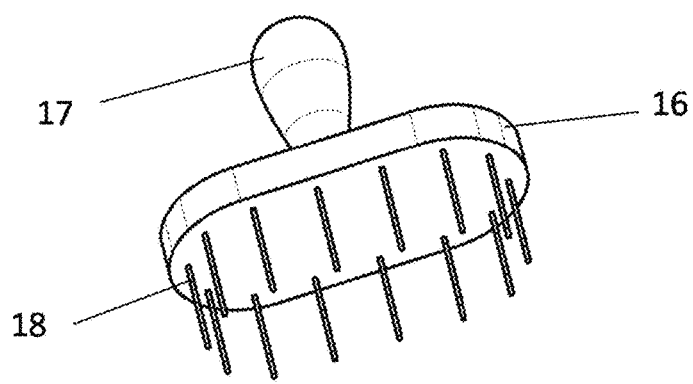
FIG. 11 is a device for removing the halves of the edible container from the mold and cleaning the through gas vents in the mold.

Some part of the dough can fill part of the through hole or block it. Therefore, it is advisable to periodically clean the holes. To do this, use a device for cleaning holes in a thermal mold for baking halves of an edible container (FIG. 11), which contains base 16 having a handle or grip 17 for easy manual use. On the other side, the base is flat and on this side the spokes 18 are fixed at the points corresponding to the locations of the through holes on the punch of the thermal mold for introducing these spokes into these holes. The operator takes the device by the handle, places the spokes on the outside of the punch opposite to the through holes and inserts the spokes into the through holes. Wide funnels guide the punch spokes into the gas ducts and they are cleaned in one motion. If any hole is clogged, the spoke knocks the crumbs out.

In the preferred embodiment the thickness of the hollows and protrusions of the tray gradually decreases on the top edge. This can be achieved by the fact that the two opposite surfaces of each hollow or protrusion of the tray converge angularly.

Figure 9:
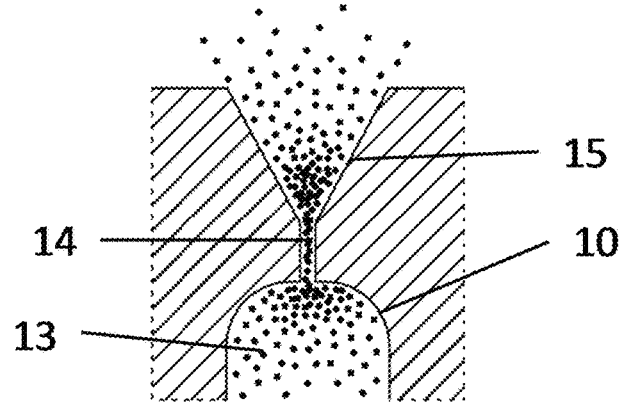
FIG. 9 is a demonstration of the shape of the through hole for the exit of the gas-vapor agent.
Figure 10:
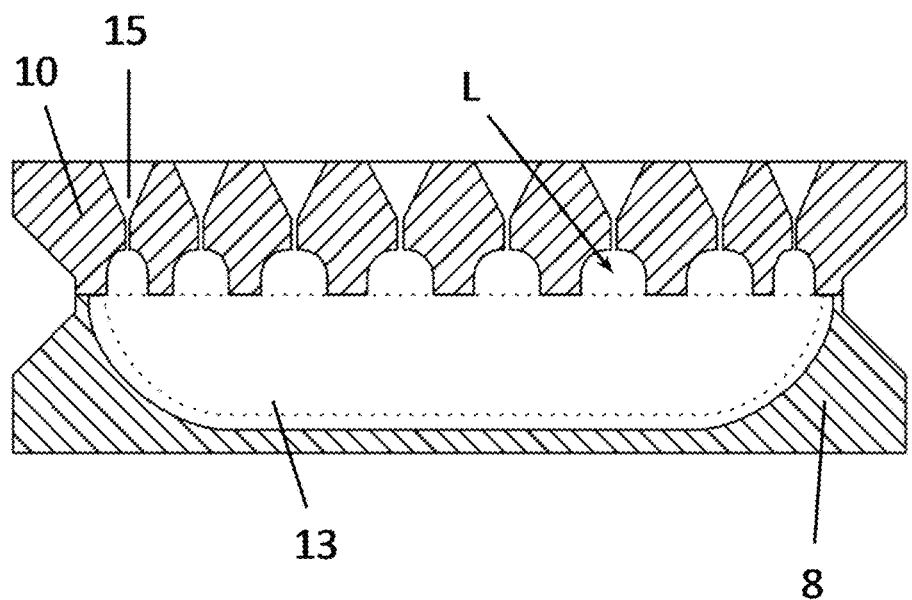
FIG. 10 is a cross-section of the mold through holes.
Figure 14:
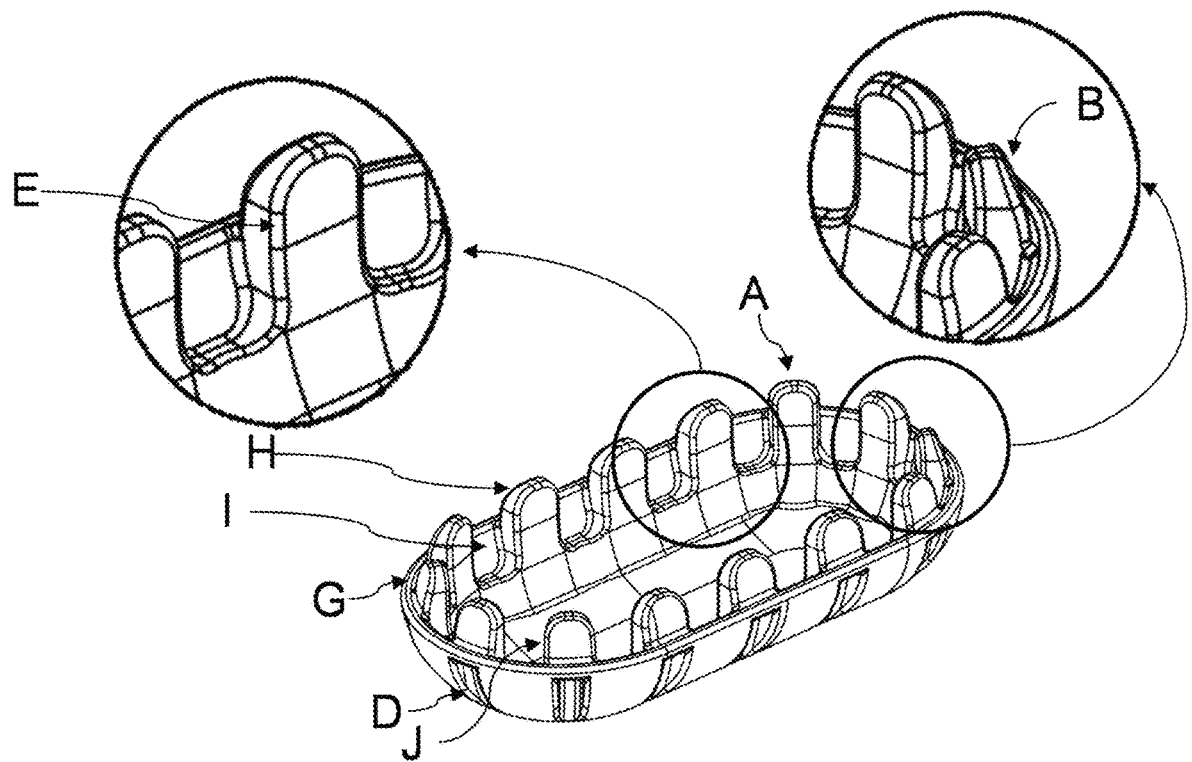
FIGS. 14-15 show a tray in the form of the edible container half.
Figure 15:
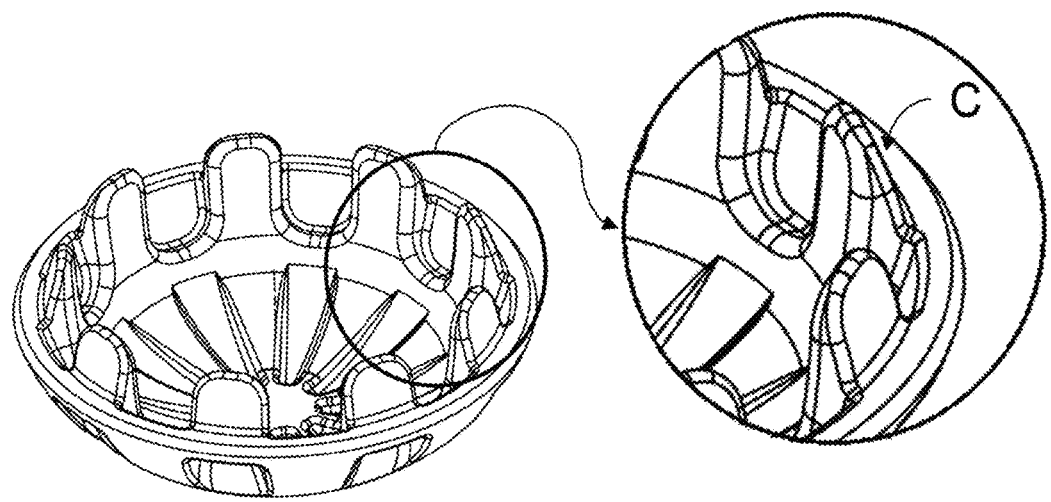

The hollows and protrusions of the tray may have two plane surfaces, one surface inside the tray and the second outside or the inner surface of each hollow of the tray is plane and the outer surface is convex (FIGS. 14-15). The inner and outer surfaces of each hollow of the tray end with an arched vault (FIGS. 9-10). The hollows and protrusions have rounded edges. This ensures uniform filling of the hollows with the dough and the escape of the steam.

In another preferred embodiment the inner surface of each hollow of the tray is plane and the outer surface is convex. This shape provides a tight connection of protrusions and hollows of the halves of the container. The hollows and protrusions of the tray may have rounded edges (FIGS. 14-15).

In the preferred embodiment the cavity of each hollow of the tray (depression) in the upper edge ends with an arched vault, which has a round hole of small diameter at its upper point. It is this shape of the protrusion cavity that allows hot and humid steam to collect upward, leaving no residue. Starting from the upper point of the arch of the hollows, a vertically drilled gas outlet duct (of the same cross-section along the entire length) extends upward inside the metal volume of the upper plate, right up to the beginning of the tapered nozzle.

The first purpose of the gas outlet duct is to bring hot steam out of the closed cavity to the outside. The second task of the gas outlet duct is to block further rise of the dough—unlike steam, thick and heavy dough is quickly baked in a very narrow elongated hole, which stops its further advancement upward.

Starting from the upper diameter of the gas outlet duct in the form of a round hole, the gas outlet nozzle, expanding linearly upward, forms a void in the material, which in its shape is a regular cone. The first purpose of the gas outlet nozzle, as well as the gas outlet duct, is to eject hot steam from the closed cavity to the outside (completion of this process). The second purpose of the gas outlet is to direct the punch pin of an extractor to the diameter of the gas outlet duct, to clean it and to remove the baked halves from the upper (second) plate (at the final stage of production).

The tray has hollows located on an outer wall of the tray opposite each hollow on an inner wall of the tray for forming hollows on the outer surface of the edible container half.

In addition, this device can be used to remove the module (half) from the punch, if this module sticks to the protrusions of the punch.

Figure 12:
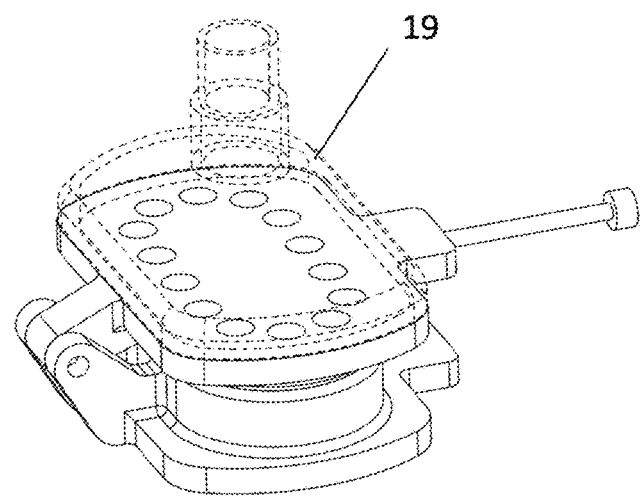
FIG. 12 is a position of the extraction device over the thermal mold.
Figure 13:
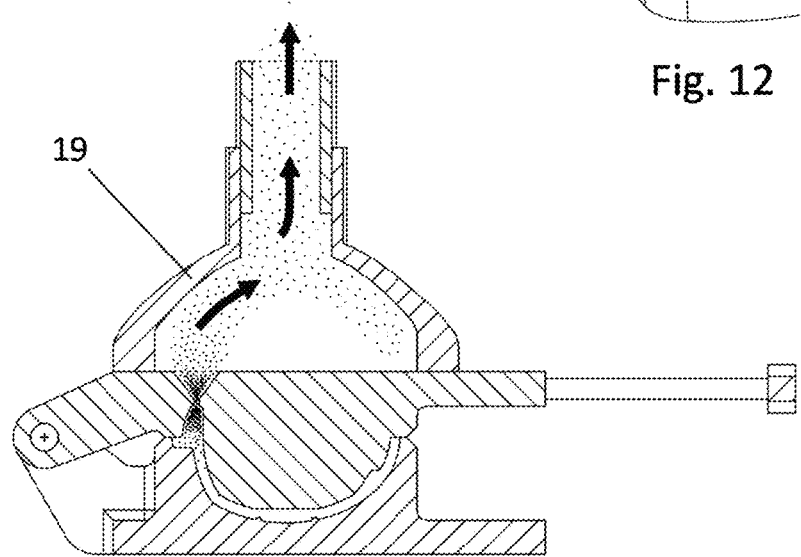
FIG. 13 shows the process of extraction of dough by the volume of the gap in the mold.

The design of the thermal press can be supplemented by a forced extraction device (FIG. 12). The extraction device is needed exclusively for "raising" the dough in the cavity of the pins, since the natural expansion of the boiling dough is rather slow due to the small holes in the punch.

The forced exhaust device (FIG. 12) includes a cap 19 placed on the outer surface of the punch around the through holes (so that these holes are inside the cap), the cavity of which is connected with the compressor for pumping air from this cavity (not shown).

The extraction device with an electric compressor turns on only in the first seconds after pouring the liquid dough and lowering the punch. As soon as the dough fills the cavities of the protrusions, the extraction device is turned off and further baking of the container modules occurs in the normal mode. The extraction funnel may not be a permanent structural element; it will be coupled for a short period of time.

Figure 16:
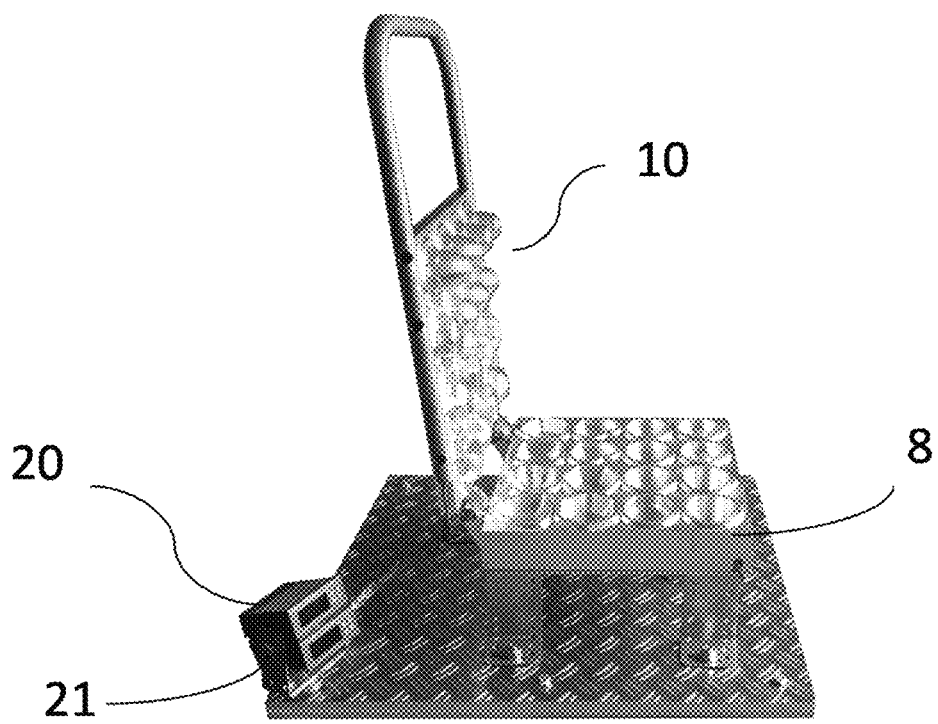
FIG. 16 shows the thermal mold with opened an upper plate with two thermostats.

A distinctive feature of the claimed thermal mold for the production of Edible Containers is the separate thermoregulation of its top and bottom (matrix and punch) (FIG. 16). This difference is explained by the shape of the baked products—for a conventional waffle iron, these are (most often) flat baked products—waffles, while for the claimed mold these are large three-dimensional modules with strongly curved (in one direction) edges. Such a non-standard shape of the container halves naturally affects both the design and the total mass of the metal of the mold—its two parts are very different in their weight, volume, and, as a consequence, in the time of their heating to a certain (the same for both) temperature.

And since equalizing the mass of the matrix plate and the punch plate seems to be an extremely inexpedient idea (due to the increase in the weight of the equipment, its price, additional costs for its daily energy consumption), the optimal solution is separate temperature control—i.e., two thermostats, which may be implemented in the proposed device.

Figure 17:
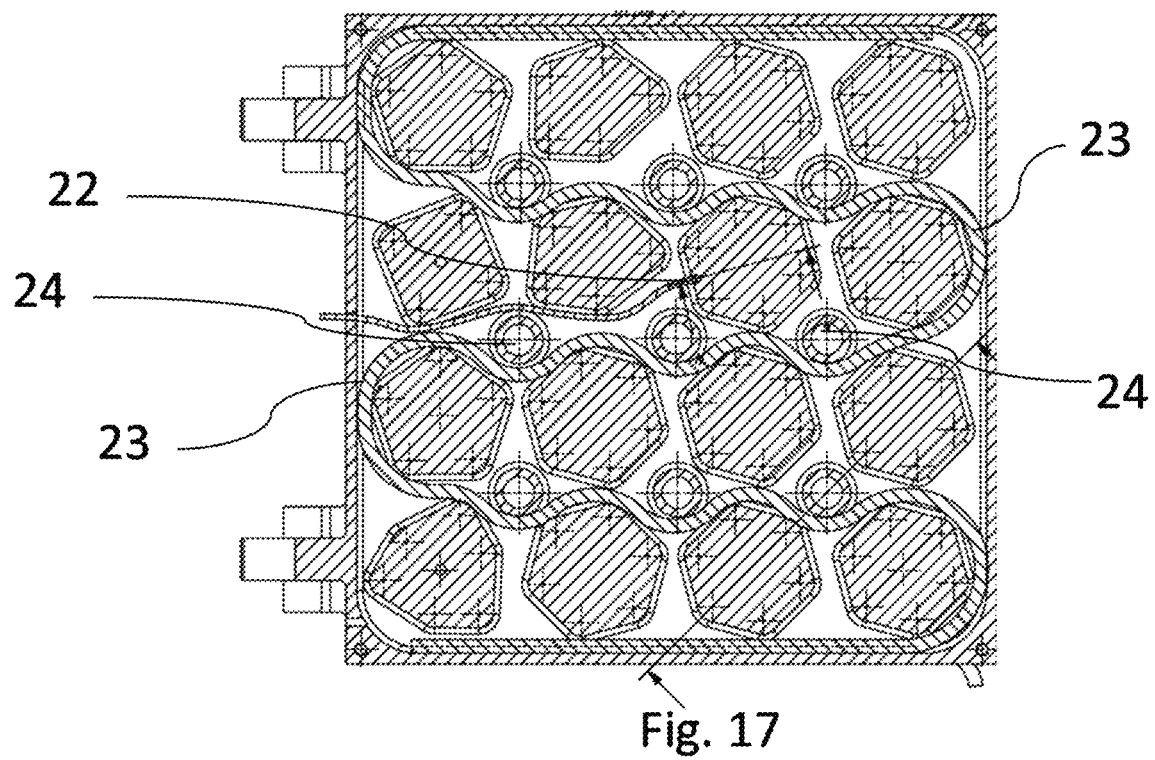
FIG. 17 shows a cross-section of the upper plate of the mold.
Figure 18:
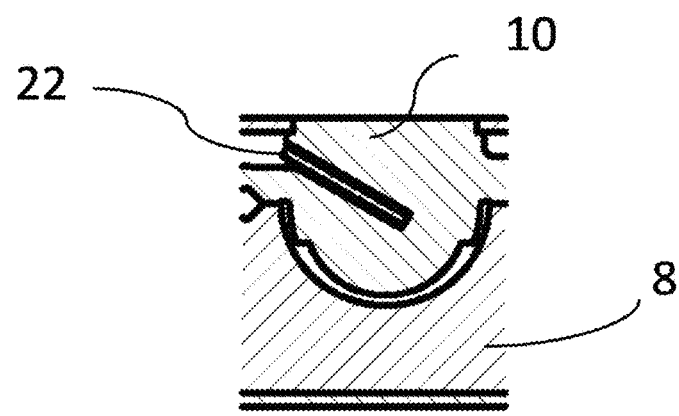
FIG. 18 shows a cross-section with a protrusion with a temperature sensor.

The technology for the production of container halves and the design features of the mold may need separate control over the heating of its plates (upper and lower), which is carried out using two independent thermostats 20, 21 (FIG. 16) and temperature sensors 22 (temperature-sensing element) (FIGS. 17, 18). A hole for the temperature sensor is drilled in one of the protrusions of the upper plate. Separate heating of the plate is carried out by using a flexible heater 23 passed between the zones of the location of the protrusions and recesses or along their perimeter on the plates from their outer side (FIGS. 17, 19-21).

Conventional waffle makers have one thermostat, which simultaneously maintains a uniform temperature on their die and punch (always identical in shape and weight).

Large vent holes 24 are through ventilation passages that cut through the upper plate (from the bottom to its upper surface). Such holes have a large diameter, while they are located in the areas of the punch area between the elements directly involved in the baking of the halves of the container. The main purpose of large gas vents is to eject/remove excess steam generated in cavities between the matrix (first plate) and the punch (second plate) as quickly as possible, especially during the industrial production.

Figure 19:
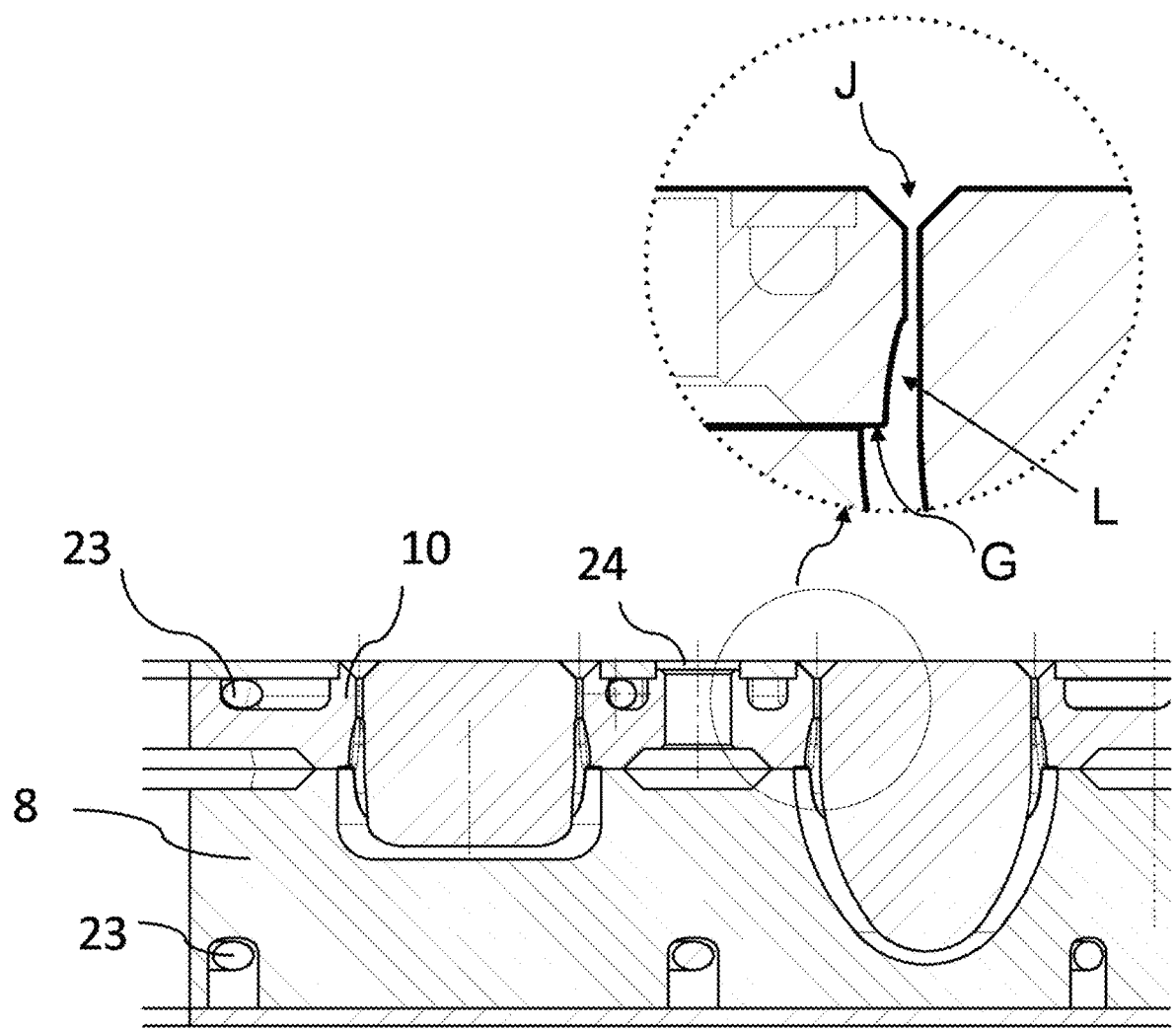
FIG. 19 shows a cross-section of the mold.
Figure 20:
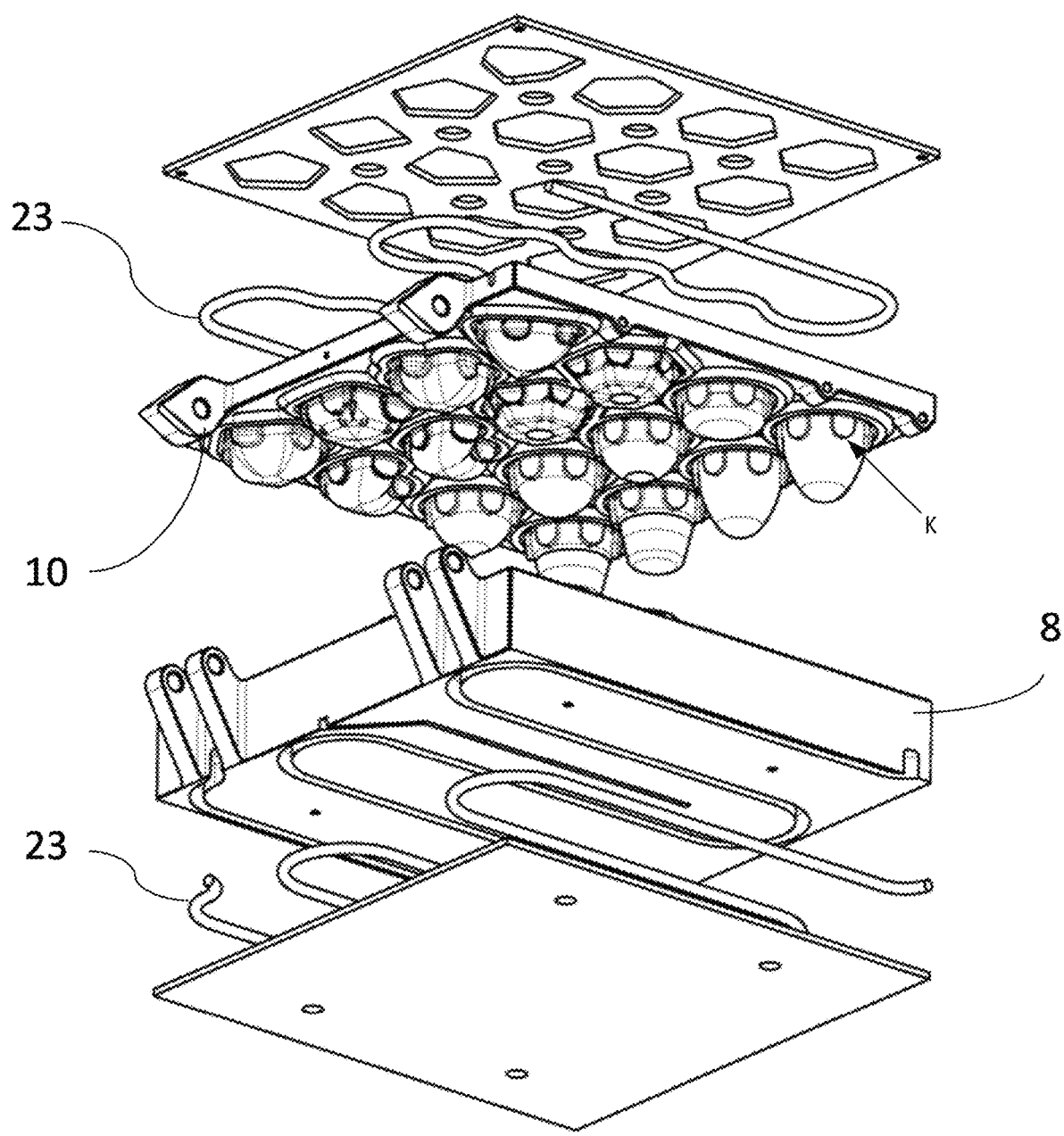
FIGS. 20-21 show the assembly drawing of the mold.
Figure 21:
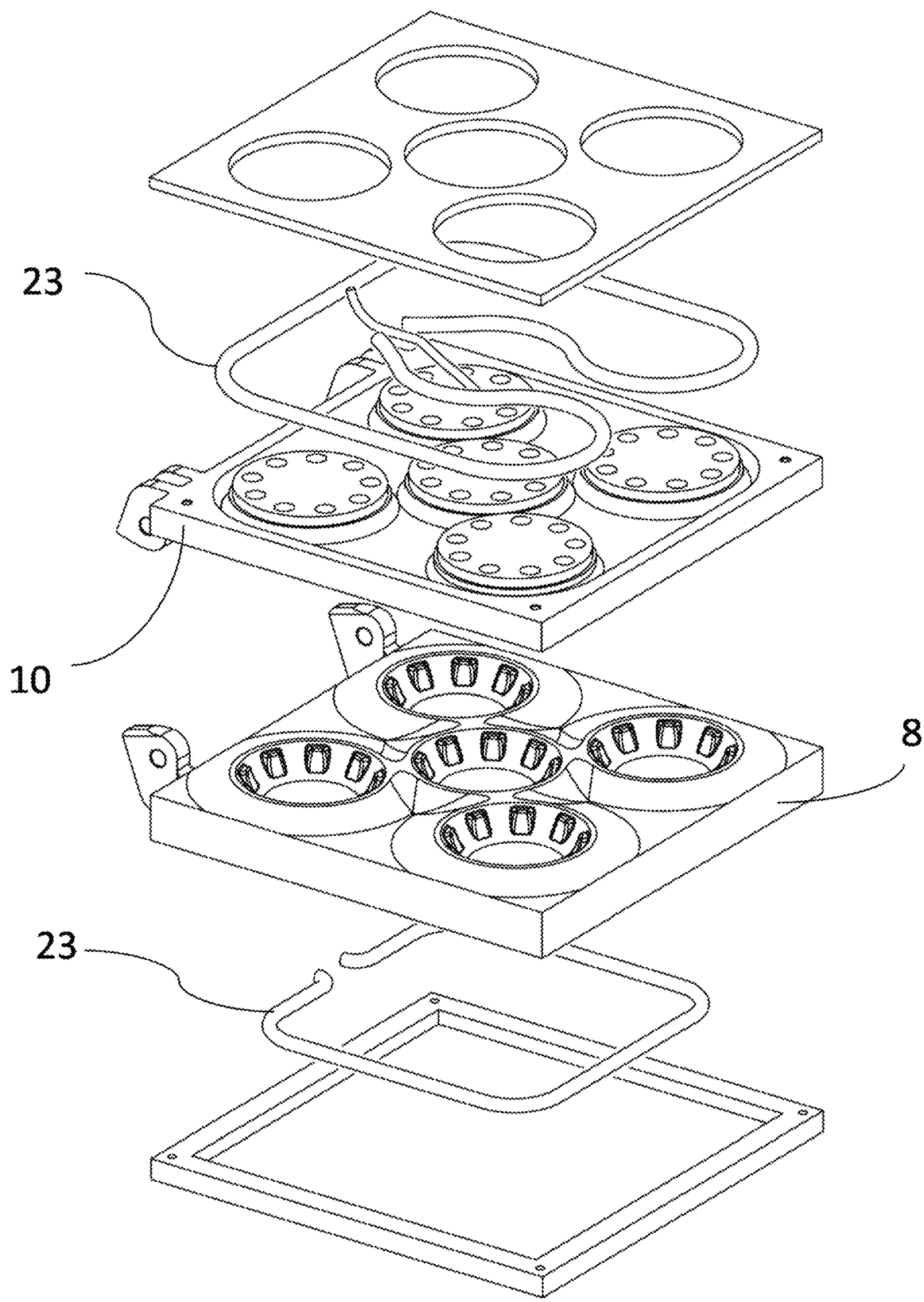
Figure 22:
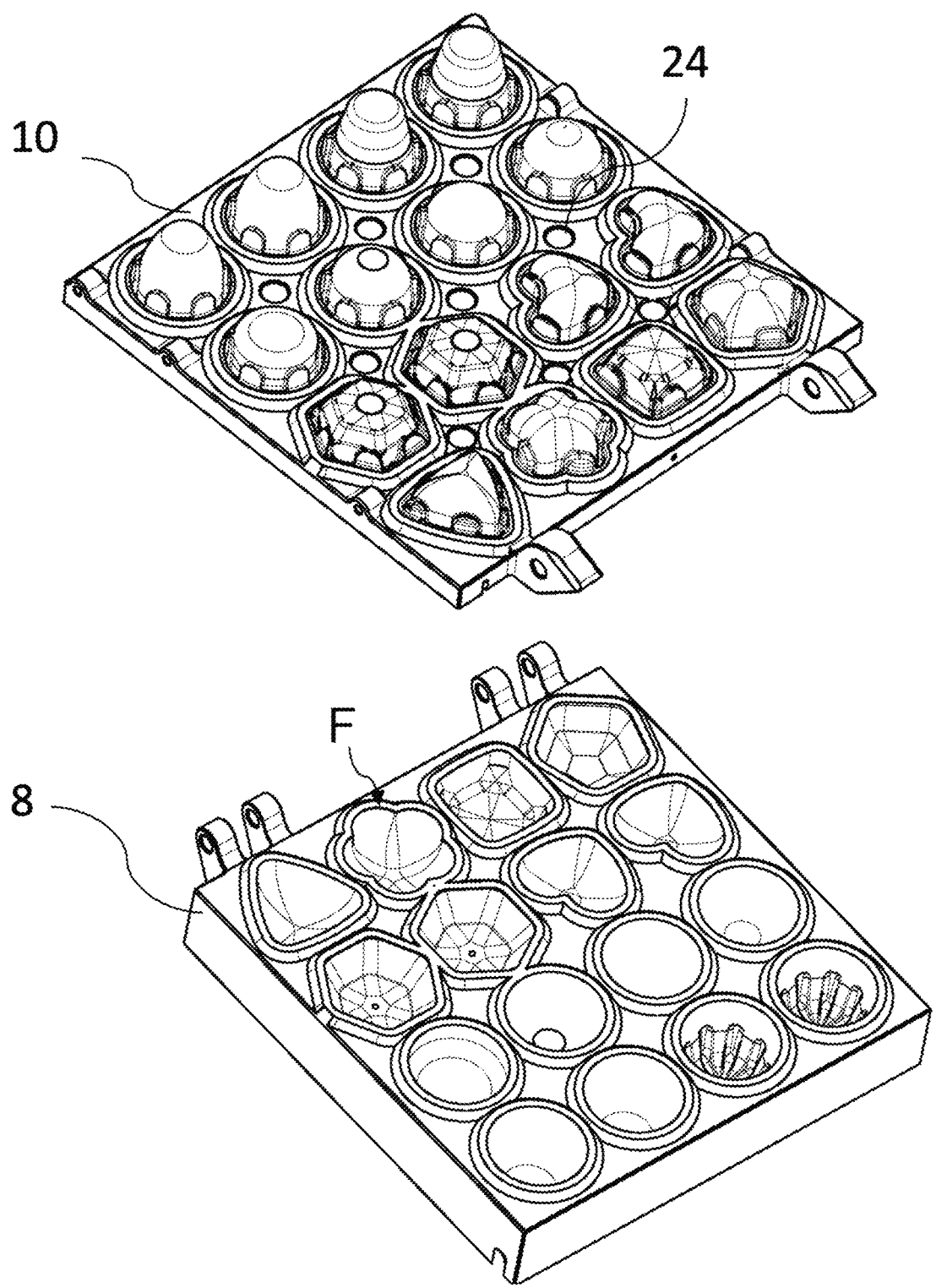
FIG. 22 shows the first and second heated plates with different types of protrusions and hollows.
Figure 23:
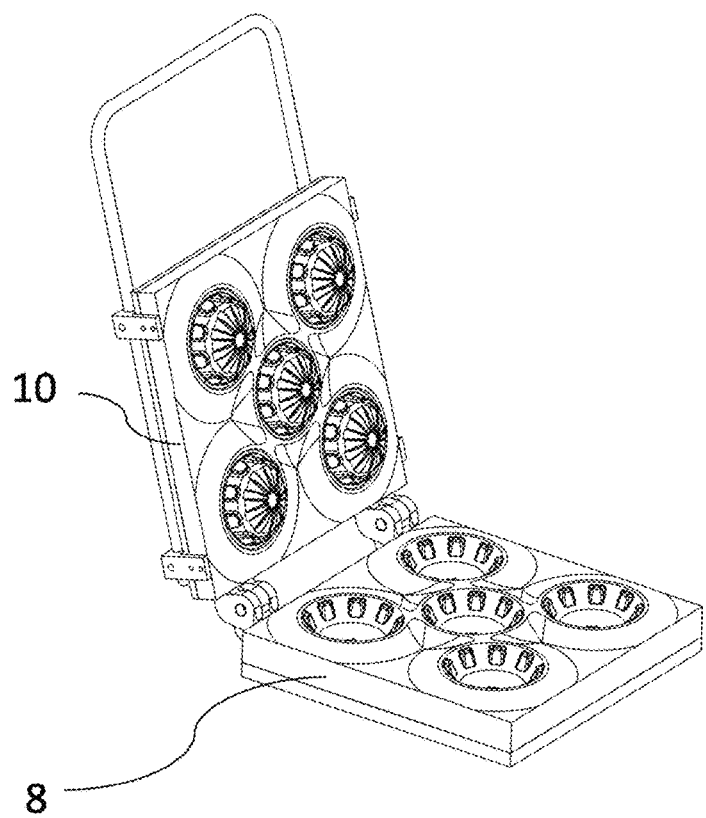
FIGS. 23-25 show additional possible configurations of the thermal mold.
Figure 24:
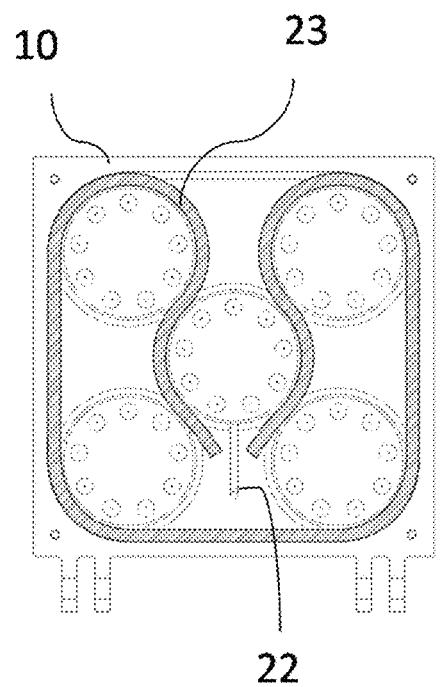
Figure 25:
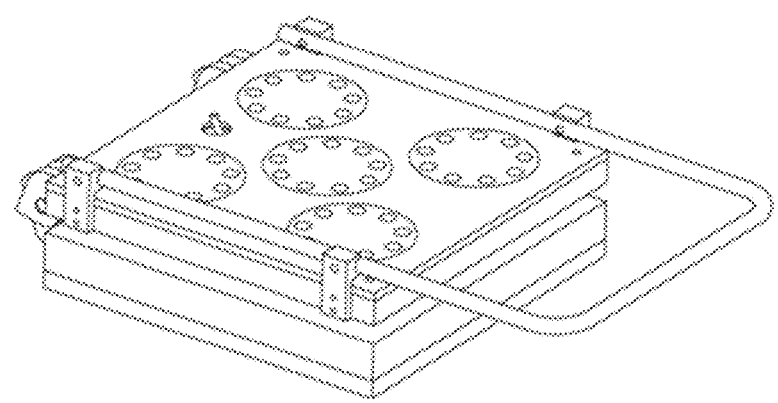

The thermal mold may have the first and second heated plates with at least two types of protrusions and hollows that replicates different shapes of two different baked products (FIGS. 19, 22).

By way of example, a thermal mold for baking halves of an edible container, includes a first (lower) heated plate (see 8 in FIG. 22) having a recess (sixteen such recesses are shown in FIG. 22) that replicates an outer surface of a baked half of the edible container; a second heated plate (10 in FIG. 22) that has at least one protrusion (sixteen such protrusions are shown in FIG. 22) that replicates an inner surface of the baked half of the edible container. When the first and second heated plates are brought together, the protrusion mates to the recess with a gap between the protrusion and the recess, where the dough is baked, so as to form the baked half of the edible container. The first and second heated plates are brought together, are in direct contact with each other in a zone around the recess (see arrow F in FIG. 22) and form the gap, where the gap is in a form of a tray (such as shown in FIG. 14) that is open at its top and corresponds to a shape of the baked container half. The second heated plate has a horizontal surface (see arrow G in FIG. 14 and FIG. 19) along its perimeter edge formed by an offset in a place of the contact of the first and second heated plates in the zone around the recess. The second heated plate has teeth (see arrow H in FIG. 14—the mold is an inverse of this, see also arrow K in FIGS. 7, 20), wherein the teeth are located inward and below the horizontal surface for forming cavities on an inner surface of the baked container half. The second heated plate has cavities (see also arrow L in FIGS. 10, 19) located between the teeth, wherein the cavities are located inward and above the horizontal surface for forming teeth on the inner surface of the baked container half. A heater for baking the edible container is located around the recess in plan view (see 23 in FIG. 17—the heater winds around the recesses/protrusions, see also FIG. 20, element 23).

The second heated plate has a plurality of holes (see, e.g., arrow J in FIG. 19) located above the cavities, the holes having a cylindrical profile of its inner portion and a tapered outer portion, the holes serving as gas outlets during baking.

A plurality of recesses may be arranged in a form of a matrix in the first heated plate (see a 4×4 matrix shown in FIG. 20), to match a plurality of protrusions in the second heated plate. The second heated plate can have through vent holes (see 24 in FIG. 22) for letting out gas during baking between the protrusions. The tapered extension acts as a gas outlet and aids in extracting the baked edible container half. Each tooth has an outer surface that is angled inward (see arrows B and C in FIGS. 14, 15—this would match the mold), and each cavity has a corresponding surface to match the angular orientation of the tooth. A thickness of the teeth can gradually decrease towards their end (see the tooth in FIG. 14, near arrow B). An inner surface of each cavity can be planar and an outer surface of each cavity can be convex. Inner and outer surfaces of each cavity of the tray can end with an arched shape (see arrow A in FIG. 14). The cavities and teeth can have rounded edges (see arrow E). The tray can have projections located on its outer wall opposite each cavity on its inner wall, for forming indentations (see arrow D in FIG. 14) on the outer surface of the baked half. The first and second heated plates have at least two types of protrusions and hollows that correspond to different shapes of two different baked products (see FIG. 22). The heater can be a flexible cable type heater, see FIG. 20, element 23. Optionally, each tooth can have two flat surfaces, which may be parallel. Optionally, each tooth can have four flat surfaces. Optionally, each tooth can have a shape of a cross-section parallel to the support end platform with straight-line portions on at least two opposite surfaces of the tooth by which it contacts the protrusions of the other half.

This invention is industrially applicable and may be manufactured using technologies used in the manufacture of wafer cups. Multiple testing of samples together with the wide variety of products and dishes placed inside them in practice confirmed the correct design and the very idea of an edible container. During testing, three important results were established:

Maintaining the form. When assembled (with food placed inside a closed volume), the edible container can be stored for hours or even days without losing its original shape.

Reliability of the design. During the whole process of eating, products and dishes do not fall out of the edible container (remaining in it from the first to the last bite).

The convenience of use. It is convenient to consume even "complex" products (like salads and porridge) in an edible container, including walking down the street, without packing and cutlery.

INDUSTRIAL APPLICABILITY

The edible container is easy to manufacture, to fill with products, to assemble, simple and convenient to eat. The edible container modules can be (although not necessarily) exactly the same, as they can be produced on the same mold.

The edible container is assembled from two modules by simply turning the upper module with its subsequent application and tight connection with the lower module.

Food of an edible container resembles ice cream in a wafer cup, with a significant difference: unlike a cup, the internal volume of the edible container is initially closed from all sides.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A thermal mold for baking halves of an edible container, comprising:
- a first heated plate having a recess that replicates an outer surface of a baked half of the edible container;
- a second heated plate that has at least one protrusion that replicates an inner surface of the baked half of the edible container,
- wherein, when the first and second heated plates are brought together, the protrusion mates to the recess with a gap between the protrusion and the recess;
- wherein, the first and second heated plates are brought together, are in direct contact with each other with an offset forming a horizontal surface in a zone around the recess and form the gap, where the gap has a form such that baked dough that fills it forms the baked half of the edible container in a shape of a thin-walled tray,
- the second heated plate has teeth located along the horizontal surface, wherein the teeth are located inward and below the horizontal surface for forming cavities on an inner surface of the baked container half; and
- the second heated plate has cavities located between the teeth, wherein the cavities are located inward and above the horizontal surface for forming teeth on the inner surface of the baked container half;
- a heater for baking the baked container half and located around the recess and the protrusion in plan view;
- wherein the second heated plate has a plurality of holes for creating reduced pressure zones in the cavities, located in a zone above the cavities in which the teeth are formed, wherein the holes have an initially cylindrical profile of its inner portion and a tapered outer portion.

2. The thermal mold of claim 1, wherein a plurality of recesses are arranged in a form of a matrix in the first heated plate, to match a plurality of protrusions in the second heated plate.

3. The thermal mold of claim 2, wherein the second heated plate has through vent holes for letting out gas during baking between the protrusions.

4. The thermal mold of claim 1, wherein the tapered extension acts as a gas outlet and aids in extracting the baked half.

5. The thermal mold of claim 1, further comprising a forced extraction device that includes a cap on an outer surface of the second plate around the holes, wherein a cavity of the cap is adapted to be connected to a compressor.

6. The thermal mold of claim 1, wherein each of the heated plates further comprises a thermostat and a temperature sensor.

7. The thermal mold of claim 1, wherein each tooth has an outer surface that is angled inward, and each cavity has a corresponding surface to match the angular orientation of the tooth.

8. The thermal mold of claim 1, wherein a thickness of the teeth gradually decreases towards their end.

9. The thermal mold of claim 1, wherein an inner surface of each cavity is planar and an outer surface of each cavity is convex.

10. The thermal mold of claim 1, wherein inner and outer surfaces of each cavity of the second heated plate end with an arched shape.

11. The thermal mold of claim 1, wherein the cavities and teeth have rounded edges.

12. The thermal mold of claim 1, wherein the second heated plate has projections located on its outer wall opposite each cavity on its inner wall, for forming indentations on the outer surface of the baked half.

13. The thermal mold of claim 1, wherein the first and second heated plates have at least two types of protrusions and hollows that correspond to different shapes of two different baked products.

14. The thermal mold of claim 1, wherein the heater is a flexible cable type heater.

15. The thermal mold of claim 1, wherein an upper portion of the cavity is a parallelepiped in side view.

16. The thermal mold of claim 1, wherein a thickness of the gap is substantially uniform throughout.

17. The thermal mold of claim 1, wherein each cavity includes two flat surfaces.

18. The thermal mold of claim 17, wherein the two flat surfaces are parallel.

19. A thermal mold for baking a half of an edible container, comprising:
- a first heated plate having a plurality of recesses, each recess replicating an outer surface of the baked half;
- a second heated plate having a plurality of protrusions, each protrusion replicating an inner surface of the baked half,
- wherein, when the first and second heated plates are brought together, the protrusions mate to the recesses with a gap between corresponding protrusion and recess;
- wherein, the first and second heated plates are brought together, are in direct contact with each other with an offset forming a horizontal surface in a zone around each recess and form the gap, where the gap has a form such that baked dough that fills it forms the baked half in a shape of a thin-walled tray,
- the second heated plate has at least three teeth located along the horizontal surface, wherein the teeth are located inward and below the horizontal surface for forming cavities on an inner surface of the baked half; and
- the second heated plate has at least three cavities located between the teeth, wherein the cavities are located inward and above the horizontal surface for forming teeth on the inner surface of the baked half;
- a heater for baking the baked halves and located around the recesses and the protrusions in plan view;
- wherein the second heated plate has a plurality of holes for creating reduced pressure zones in the cavities, located in a zone above the cavities in which the three teeth are formed.

* * * * *